United States Patent
Spindeldreher

[11] Patent Number: 5,114,324
[45] Date of Patent: May 19, 1992

[54] ROTARY HYDRAULIC MOTOR WITH BRAKE SYSTEM

[75] Inventor: Walter Spindeldreher, Irschenberg, Fed. Rep. of Germany

[73] Assignee: Kinshafer Greiftechnik GmbH, Miesbach, Fed. Rep. of Germany

[21] Appl. No.: 612,397

[22] Filed: Nov. 9, 1990

[30] Foreign Application Priority Data

Feb. 13, 1990 [DE] Fed. Rep. of Germany ....... 4004411
Mar. 15, 1990 [DE] Fed. Rep. of Germany ....... 4008362

[51] Int. Cl.$^5$ ............................. F03C 2/08; F04C 2/10
[52] U.S. Cl. .................. 418/61.3; 418/181; 188/170; 192/1.36
[58] Field of Search ................ 418/61.3, 181; 192/1.36; 188/170

[56] References Cited

U.S. PATENT DOCUMENTS

| | | | |
|---|---|---|---|
| 3,403,763 | 10/1968 | Hilpert et al. | 192/56 |
| 3,616,882 | 11/1971 | White | 418/61.3 |
| 3,960,470 | 6/1976 | Kinder | 418/61.3 |
| 4,415,067 | 11/1983 | Cory | 188/170 |
| 4,667,784 | 5/1987 | Cronin | 188/170 |
| 4,981,423 | 1/1991 | Bissonette | 418/61.3 |

FOREIGN PATENT DOCUMENTS

2610524C2 9/1976 Fed. Rep. of Germany .

*Primary Examiner*—Richard A. Bertsch
*Assistant Examiner*—David L. Cavanaugh
*Attorney, Agent, or Firm*—Morgan & Finnegan

[57] ABSTRACT

A rotary hydraulic motor which comprises a brake which is adapted to be applied under the pressure of springs and to restrain the output shaft of the hydromotor when the hydromotor is not pressurized and which is arranged to a supply of hydraulic liquid under pressure to the hydraulic motor. In order to ensure that the hydraulic liquid can be withdrawn from the hydraulic cylinder in a simple manner when the motor has stopped so that the brake can subsequently be applied, the piston of the hydraulic cylinder is provided with an orifice plate or a throttle bore through which the hydraulic liquid can enter a chamber of the hydraulic motor.

8 Claims, 3 Drawing Sheets

ROTARY HYDRAULIC MOTOR WITH BRAKE SYSTEM

BACKGROUND OF THE INVENTION

1. Field of the Invention

This invention relates to a rotary hydraulic motor, preferably a ring gear motor, comprising a brake, which is adapted to be applied under the pressure of springs and to restrain the output shaft of the hydromotor when the hydromotor is not pressurized and which is arranged to be lifted by a hydraulic cylinder in response to a supply of hydraulic liquid under pressure to the hydraulic motor.

2. Description of the Prior Art

In rotary hydraulic motors used to drive winches or grabs, it is desirable and often necessary to restrain the motor shaft by the brake when the hydraulic motor is not pressurized so that it does not deliver an output torque.

It is known per se that the motor shaft can be restrained by a brake, which is biased by compression springs, and to lift the brake in that the compression springs are compressed by a hydraulic cylinder when the motor is started by a supply of hydraulic liquid under pressure. That hydraulic liquid is simultaneously supplied to the hydraulic cylinder for lifting the brake.

But a special problem resides in that the shutting off of the pressure line will stop the motor because it is no longer supplied with hydraulic liquid under pressure and in that case hydraulic liquid can no longer flow back from the hydraulic motor, which is substantially relieved from pressure. As a result, liquid under pressure cannot leave the brake-lifting hydraulic cylinder so that the brake will remain lifted also when the motor is at a standstill. To permit an application of the brake even when the hydraulic motor has been stopped by a shutting off of the pressure line for supplying hydraulic liquid to the motor, it is necessary to provide special means which permit a reverse flow of hydraulic liquid out of the hydraulic cylinder.

SUMMARY OF THE INVENTION

For this reason it is an object of the invention to provide a hydraulic motor which is of the kind described first hereinbefore and in which the hydraulic liquid can be withdrawn from the hydraulic cylinder in a simple manner when the motor has stopped so that the brake can subsequently be applied.

In a hydraulic motor which is of the kind described first hereinbefore that object is accomplished in accordance with the invention in that the piston of the hydraulic cylinder is provided with an orifice plate or a throttle bore through which the hydraulic liquid can enter a chamber of the hydraulic motor. When the hydraulic motor in accordance with the invention has been stopped because the supply of hydraulic liquid from the hydraulic cylinder has been shut off the hydraulic liquid can flow back through the throttle bore so that the compression springs will then apply the brake. Because the piston is biased by the force of the compression springs, a shutting off of the pressure line to the hydraulic motor will have the result that the compression springs cause the piston to displace the hydraulic liquid out of the cylinder until the brake has been applied. As the step piston is forced back, the volume in which the hydraulic motor can receive liquid is increased so that the corresponding chamber of the hydraulic motor can receive the hydraulic liquid which has been displaced out of the hydraulic cylinder or the annular space in said cylinder.

The cross-sectional area of the throttle bore must be so selected that the pressure drop in said bore will be so large that the pressure drop resulting on the pressure side will be negligibly small. In addition, shutter means may be provided for closing the throttle bore or the orifice in the orifice plate when the piston of the hydraulic cylinder has lifted the brake. In that case there will be no flow of hydraulic liquid through the orifice plate or throttle bore during the operation of the motor so that losses, which will be small in any case, will entirely be avoided.

The invention can be applied to special advantage to a ring gear motor or to an internal-geared hydraulic gear machine which comprises a shaft provided with gear teeth and an annular piston, which has internal and external gear teeth and defines displacement chambers with the internal gear of the housing or the gear teeth of the shaft and which performs a tumbling motion to open and close inlet and outlet valve ports. Such a motor is known, e.g., from German Patent Specifications 33 42 131 and 37 29 049. Such motors are usually employed as drive means for imparting a rotation to grabs or the like. Those known motors have no brakes and for this reason will continue to rotate when the pressure line for supplying hydraulic liquid has been shut off. For this reason a particularly desirable feature of the invention resides in that particularly in a ring gear motor the brake is a multiple-disk brake, in which the disks are provided with internal and external gear teeth in alternation and are axially slidably mounted on splines of the output shaft and on splines of the housing, respectively, the piston is an annular step piston, which is fitted on the output shaft and is guided on mating cylindrical inside surfaces of the housing, which are separated by a shoulder, an annular cylindrical chamber is defined by the sections of the step piston and the cylindrical inside surfaces of the housing, said cylindrical chamber communicates through a bore or line with the pressure line leading to the hydraulic motor, the piston is biased by prestressed compression springs, which are held between the piston and an abutment which is fixed to the housing, the set of disks bear against the housing or the shaft, and said springs force said step piston against the set of disks when the cylinder chamber is relieved or substantially relieved from pressure. Such a multiple-disk brake can be embodied in a particularly desirable manner in an internally geared hydraulic gear machine because the output shaft of that machine extends concentrically out of a cylindrical housing portion which surrounds that shaft. In such a machine a simple bore extending through the piston will be sufficient to ensure that the hydraulic liquid confined in the hydraulic cylinder can escape when the pressure line for supplying driving fluid to the hydraulic motor has been shut off.

The step piston is suitably provided with an annular extension at that end of the piston which faces the set of disks so that said extension virtually constitutes a pressure-applying ring for compressing the set of disks.

In accordance with a further feature of the invention the throttle bore opens in an annular end face of the step piston and that annular end face is forced against a seat that is fixed to the housing when the cylinder chamber is pressurized. In that case a continuous flow of hydraulic liquid through the bore during the operation of the motor will be prevented because the throttle bore will be closed as soon as the piston engages its limit stop.

That seat which is fixed to the housing may be constituted by an outer race of a rolling element bearing.

The compression springs suitably bear on an abutment ring, which engages the outer race of a rolling element bearing.

Detailed Description of the Preferred Embodiment

Figure 1:
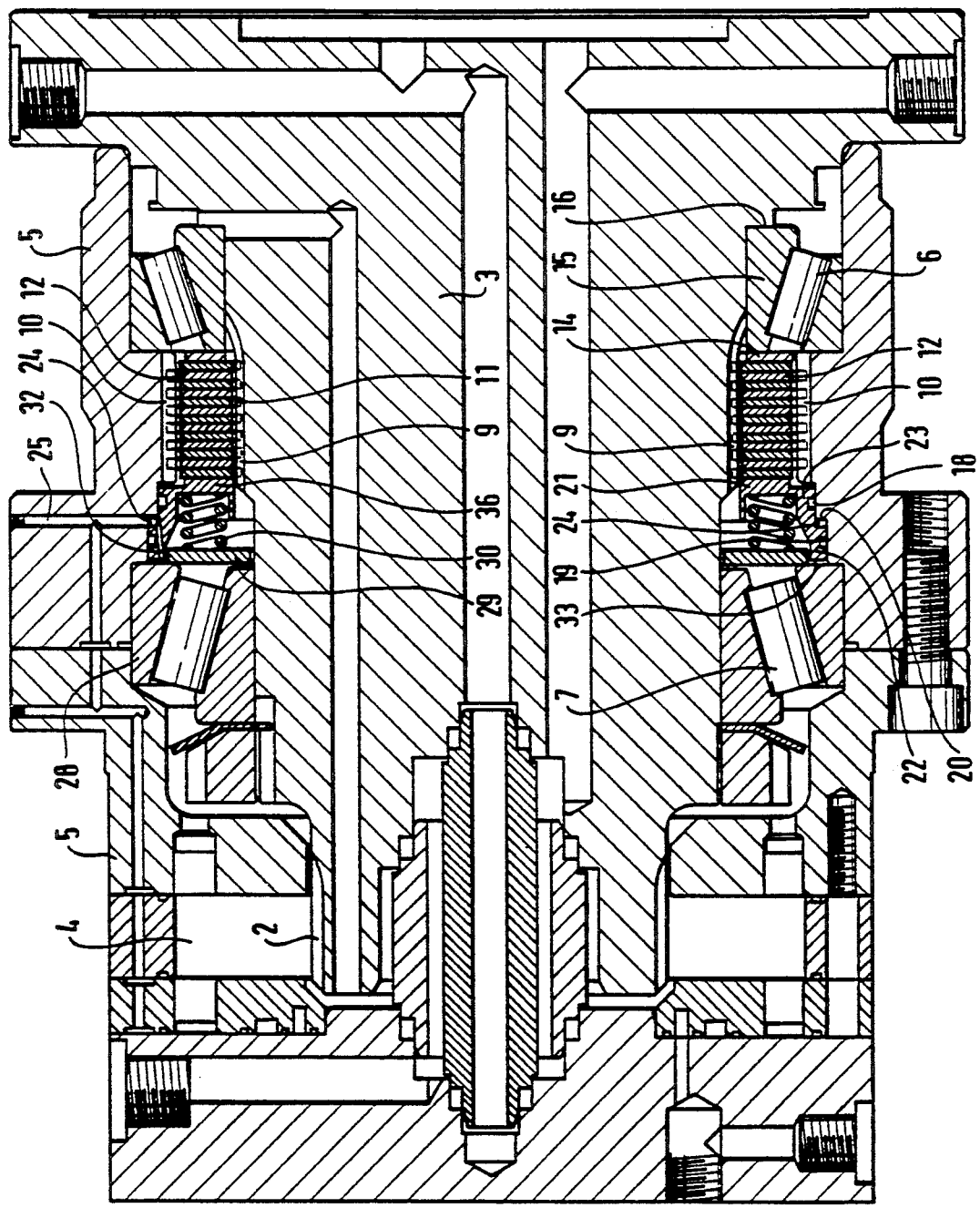
FIG. 1 is a longitudinal sectional machine showing a rotary hydraulic motor which is constituted by an internally geared gear machine.

An illustrative embodiment of the invention will now be described in more detail with reference to the drawing.

The internally geared hydraulic gear machine shown in the drawing is basically similar to the rotary hydraulic motors which are disclosed in German Patent Specifications 33 42 131 and 37 29 049. For this reason the present machine will not be described here in more detail.

Figure 2:
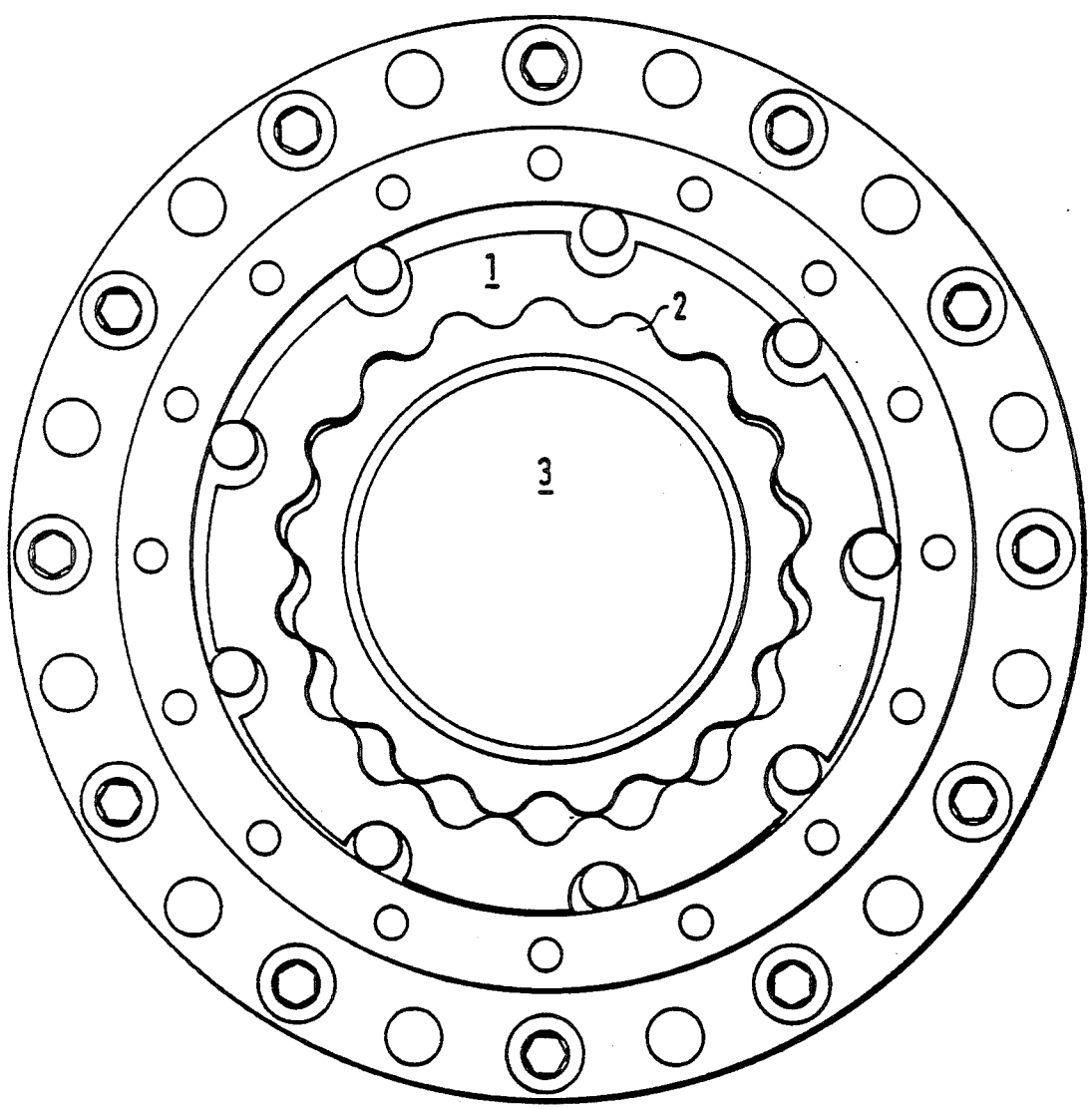
FIG. 2 is a top plan view showing the shaft, which is provided with gear teeth, and the annular piston, which is provided with internal and external gear teeth and which defines displacement chambers with the gear teeth of the shaft.
Figure 3:
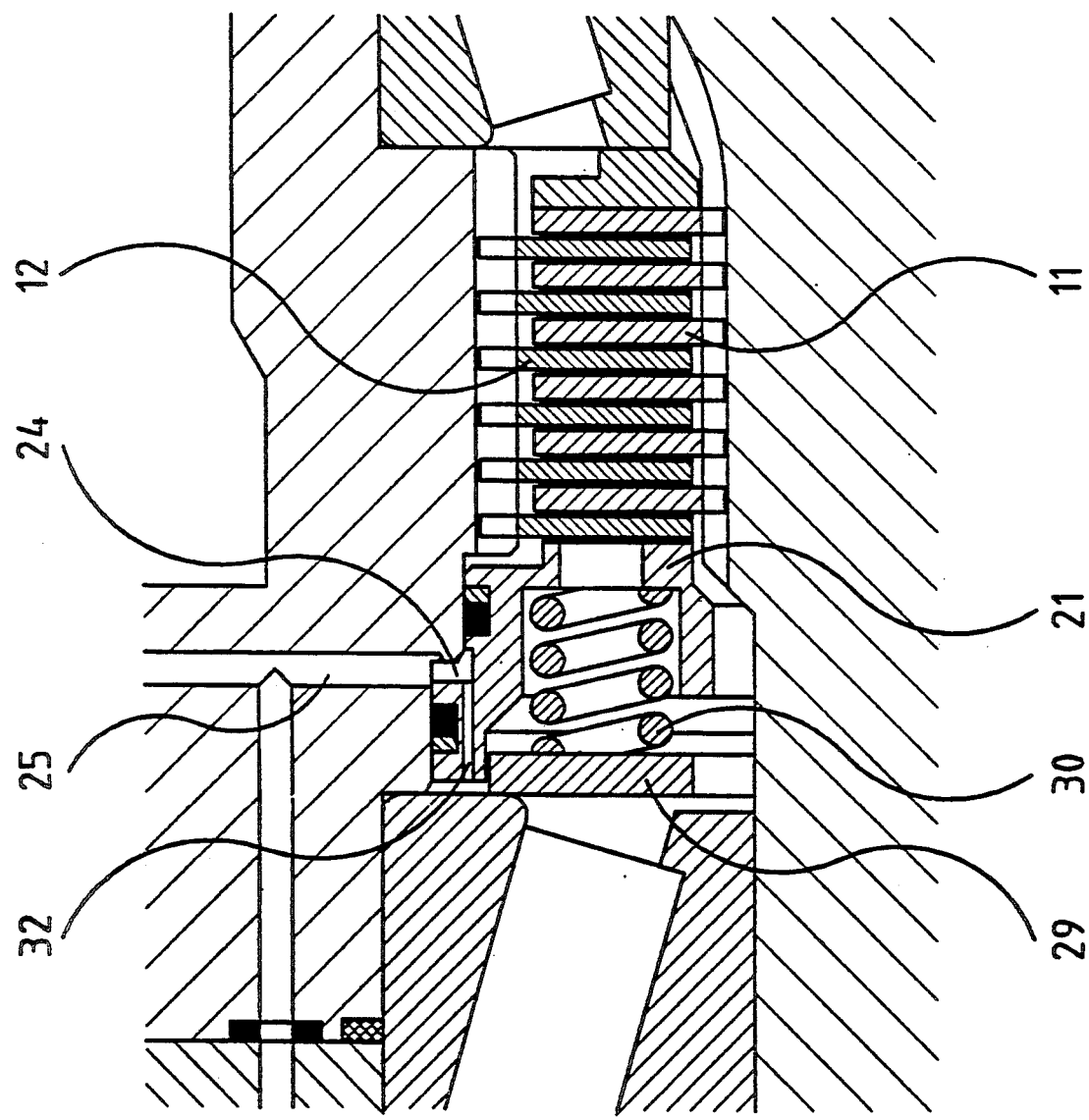
FIG. 3 is an enlargement of a portion of FIG. 1 showing the space, throttle bore, spring of the brake.

FIG. 1 does not show the annular piston 1, which is apparent from FIG. 2 and which defines the displacement chambers with the gear teeth 2 of the shaft 3. The annular piston 2 is accommodated in the chamber 4 shown in FIG. 1.

The shaft 3 is rotatably mounted by tapered roller bearings 6, 7 in a cylindrical housing 5, which is composed of rings. Between the rolling element bearings 6, 7 the shaft 3 is provided with splines 9, which are parallel to generatrices of the shaft 3. The cylindrical inside surface of the housing 5 is similarly formed with parallel splines 10. The internal gear teeth of disks 11 extend into the splines 9 of the shaft 3. External gear teeth of disks 12 extend into the splines 10. The disks 11 and 12 constitute the set of disks of a multiple-disk brake. Said set of disks bear on a ring 14, which engages an inner race 15 of the rolling element bearing 6. The inner race 15 is held against the annular shoulder 16 of the shaft 3.

Adjacent to that portion which is formed with the internal splines 10, the inside surface of the housing has smooth cylindrical surface portions 18, 19. The smooth inside surface portion 18 is smaller in diameter so that a shoulder 20 is formed between the inside surface portions 18 and 19. An annular step piston 21 is guided on the cylindrical inside surface portions 18, 19 and surrounds the shaft 3. The step piston 21 comprises piston portions 22 and 23, which are separated by a shoulder and conform to the cylindrical inside surface portions 18 and 19 so that an annular cylinder chamber 24 is provided between the shoulders of the housing 5 and of the piston 21. The housing 5 is formed with a bore 25, which opens into that annular cylinder chamber and which communicates through further bores with the pressure side of the internally geared motor.

The outer race 28 of the rolling element bearing 7 is fixed to the housing and is engaged by a ring 29. Compression springs 30 are held under initial stress between the ring 29 and suitable retaining bores provided on the rear end face of the piston 21.

The piston 21 is formed with a throttle bore 32, which opens at one end into the annular cylinder chamber 24 and at the other end in the forward annular end face 33 of the piston 21. As a result, the throttle bore 32 will be closed when the forward annular end face 33 bears against the outer race 28 of the rolling element bearing 7.

At that end which faces the set of disks 11, 12 the annular piston 21 is provided with an annular extension 36, which constitutes a pressure-applying ring for compressing the set of disks when the annular cylinder chamber 24 has been relieved from pressure and the compression springs 30 force the annular piston 21 against the set of disks so that the brake is applied.

In the embodiment illustrated by way of example the internally geared motor may be supplied with 20 liters of liquid per minute from a hydraulic system under a pressure of 200 bars. If the bore 32 is 0.5 mm in diameter, the pressure difference between the two ends of the annular piston will be about 4 bars so that a pressure ratio of 200/196 will be obtained. That pressure difference will be almost negligible because it results in a flow rate of only 2 to 3 liters per minute.

The volume which is to be displaced out of the annular cylinder chamber 24 when the pressure line to the motor has been shut off amounts to about 6 cm$^3$ so that the brake will be applied relatively soon after the motor has stopped.

Because the application of pressure to the annular piston 21 will cause the annular end face 22 of that piston to move against the outer race 28 of the rolling element bearing 7, hydraulic liquid will flow through the throttle bore 32 only while the annular piston 21 is moved to lift the multiple disk brake. The throttle bore 32 will substantially be closed as soon as the annular end face of the piston bears on the outer race 28.

The hydraulic liquid which has entered the throttle bore 24 flows into the internal chamber which is provided in the hydraulic motor behind the annular piston and the hydraulic liquid that has been displaced out of the cylinder chamber 24 can be received by said internal chamber because the volume of the latter is increased as the piston is forced back.

I claim:

1. In a rotary hydraulic motor comprising a brake, which is adapted to be applied under the pressure of springs and to restrain an output shaft of a hydraulic motor when the hydraulic motor is not pressurized and which is arranged to be lifted by a hydraulic cylinder in response to a supply of hydraulic liquid under pressure to the hydraulic motor, the improvement wherein a piston of the hydraulic cyclinder is provided with a bore means through which the hydraulic liquid can enter a chamber of the hydraulic motor.

2. A hydraulic motor according to claim 1, wherein a set of brake is a multiple-disk brake, in which the disks are provided having internal and external gear teeth in alternation and are axially slidably mounted on splines of the output shaft and on splines of a housing, respectively, the piston is an annular step piston, which is fitted on the output shaft and is guided on mating cylindrical inside surfaces of a housing which are separated by a shoulder, an annular cylindrical chamber is defined by sections of the step piston and cylindrical inside surfaces of the housing, said cylindrical chamber communicates through a bore or line with a pressure line leading to the hydraulic motor, the piston is biased by pre-stressed compression springs which are held between the piston and an abutment which is fixed to the housing, the set of disks bear against the housing or the shaft, and said springs force said step piston against the set of disks when the cylinder chamber is relieved or substantially relieved from pressure.

3. A hydraulic motor according to claim 1, wherein the step piston is provided with an annular extension at that end of the piston which faces the set of disks.

4. A hydraulic motor according to claim 1, wherein the throttle bore opens in an annular end face of the step piston and that annular end face is forced against a seat that is fixed to the housing when the cylinder chamber is pressured.

5. A hydraulic motor according to claim 2, wherein the seat is constituted by an outer race of a rolling element bearing.

6. A hydraulic motor according to claim 2, wherein the springs are compression springs which bear on an abutment ring, which engages an outer race of a rolling element bearing.

7. A hydraulic motor according to claim 4, wherein the bore means is a throttle bore.

8. A hydraulic motor according to claim 7, wherein the bore means is an orifice plate.

* * * * *